Jan. 21, 1941.   R. P. POWERS   2,229,338
GEARING DEVICE
Filed July 26, 1937   2 Sheets-Sheet 1
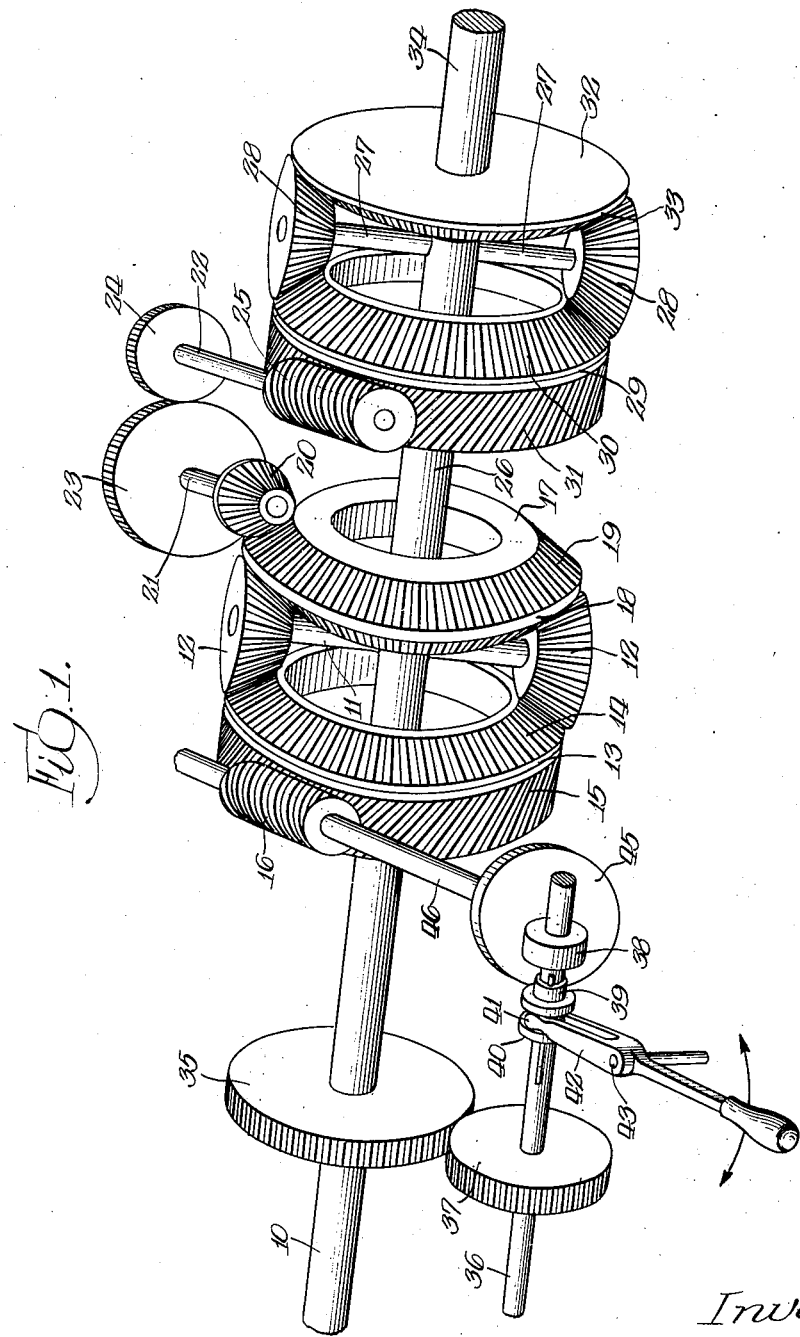
Inventor:-
Robert P. Powers,
By Wilkinson, Huxley, Byron & Knight
Attys.

Jan. 21, 1941.   R. P. POWERS   2,229,338
GEARING DEVICE
Filed July 26, 1937   2 Sheets-Sheet 2
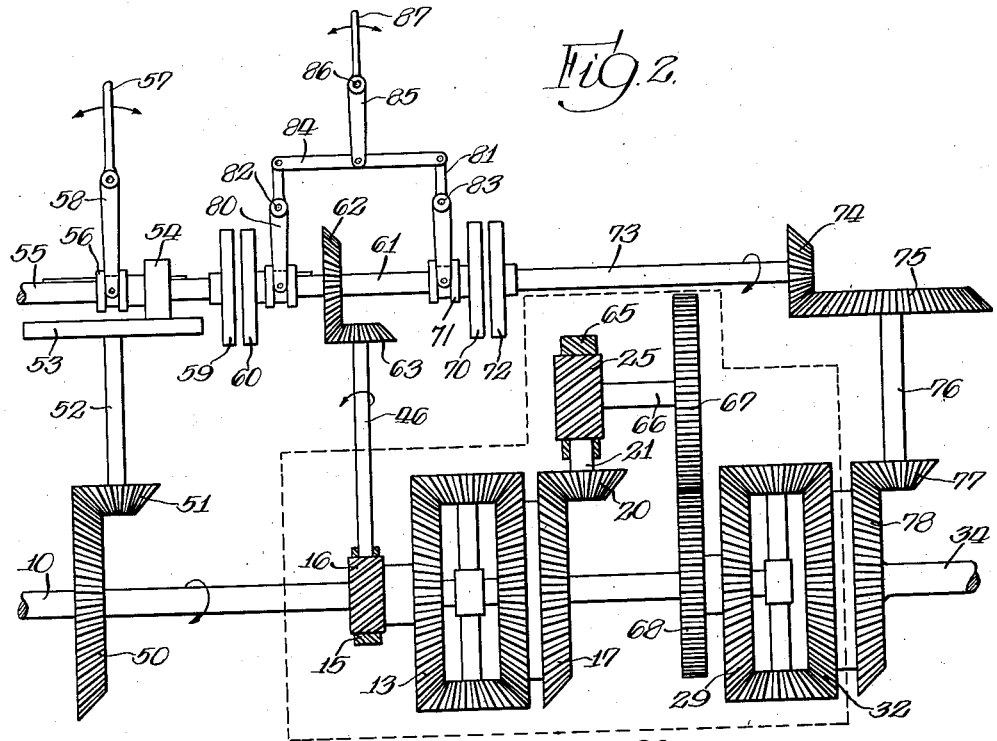
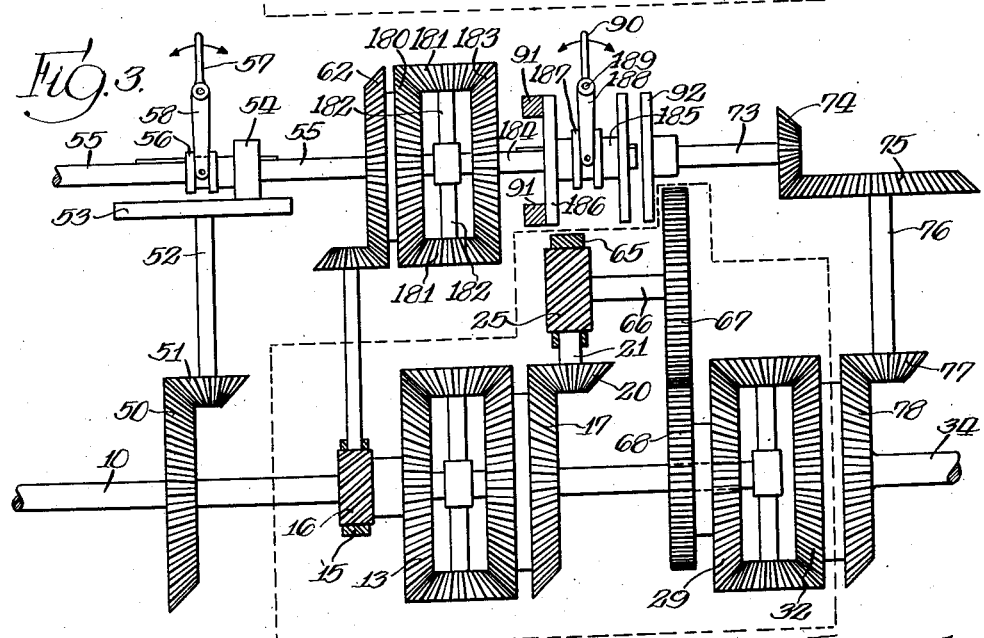
Inventor:-
Robert P. Powers,
By Wilkinson, Huxley, Byron & Knight
Attys.

Patented Jan. 21, 1941

2,229,338

UNITED STATES PATENT OFFICE 2,229,338

GEARING DEVICE

Robert P. Powers, Benton, Ill.

Application July 26, 1937, Serial No. 155,630

9 Claims. (Cl. 74—285)

This invention relates to a new and improved gearing device of the type adapted for connecting a driving device such as a motor or other prime mover or source of power with a shaft or mechanism to be driven and is characterized as providing a direct gearing connection which will establish any desired gear ratio in either direction of rotation between the driving and driven shafts and will also establish a so-called "neutral" relationship whereby the driven mechanism is at rest or is in effect free from the driving mechanism.

The gearing of this invention is further characterized as including control mechanism which requires a relatively small amount of power for its operation and yet will effectively control the movement of the gearing parts while transmitting relatively large amounts of power whereby the driven element may receive the full benefit of the power of the prime mover at any desired gear ratio which may be selectively determined by the relatively sensitive control mechanism.

Other objects of this invention not specifically enumerated are contemplated for this invention and will be better understood by referring to the following description of one preferred embodiment of the invention which is given by way of example. The following description relates to the embodiment of the invention set forth in the accompanying drawings, in which:

Figure 1 is a perspective view of a gearing assembly constructed and arranged in accordance with this invention but with frame parts and bearings eliminated so as to better show the features of novelty;

Figure 2 is a plan view of a gearing assembly with frame and bearings eliminated, constructed and arranged in accordance with this invention and having a modified form of control mechanism, and, Figure 3 is a plan view similar to Figure 2 of a gearing assembly, with frame and bearings eliminated, constructed and arranged in accordance with this invention and having a further modified form of control mechanism.

By referring to the drawings it will be observed that the illustrative embodiment of this invention comprises a drive shaft 10, which is connected by any suitable means to a source of power such as a prime mover or similar device. Connected with the drive shaft 10 are a pair of diametrically disposed radial axles 11—11 which serve as bearing supports for beveled planetary gears 12—12 rotatably mounted respectively on the ends of the axles. Surrounding the drive shaft 10 and in mesh with the beveled planetary gears 12—12, is a ring gear 13 which has on one face thereof, beveled gear teeth 14 in mesh with the beveled gears 12—12. On the outer face of ring gear 13, a worm gear 15 is provided which meshes with a controlling worm 16. Disposed on the opposite side of the beveled gears 12—12 is a second ring gear 17 having beveled gear teeth 18 on one face thereof which mesh with the beveled gears 12—12. On another portion, the ring gear 17 has suitable beveled gear teeth 19 which mesh with a beveled gear 20 which latter gear in turn is connected by shafts 21 and 22 and spur gearing 23 and 24 to a worm 25 substantially as shown in Figure 1. Gears 20, 23 and 24 are all selected to provide the desired ratio between the ring gears 17 and 29 which in the case illustrated is a 1 to 1 ratio.

As illustrated, the drive shaft 10 is extended as at 26 beyond the radial axles 11—11 and through the ring gear 17, which extension is provided with additional diametrically disposed radial axles 27—27. Rotatably mounted on the ends of the axles 27—27 are planetary beveled gears 28—28 similar to the gears 12—12. Surrounding the extension 26 of the drive shaft is a suitable ring gear 29 having beveled gear teeth 30 on one portion thereof which mesh with the planetary beveled gears 28—28. A ring gear 29 is also provided with a worm gear portion 31 which meshes with the worm 25 above referred to. On the opposite sides of the beveled gears 28—28 is a driven gear 32 provided with suitable beveled gear teeth 33 which mesh with the beveled gears 28—28. This driven gear 32 preferably connects with a driven shaft 34 which is in turn connected by means not shown, to any mechanism to be driven through the instrumentality of this gearing mechanism.

It will be noted that the above described mechanism comprises essentially two differential gear units both connected through their planetary gears to a single drive shaft and through a suitable gear train which includes a worm meshing with their adjacent ring gears, to each other. The worm prevents any driving force from being imparted through the gear train to the first differential gear unit from the second differential gear unit.

This portion of the disclosed mechanism constitutes what may be regarded as the gearing assembly proper and is that portion which is enclosed within the dotted lines in Figures 2 and 3. The gearing assembly proper, of course, must be designed of the size and strength required to transmit the driving forces necessary to overcome the load and do the work of the driven device. The remainder of the arrangement shown in the drawings is that which constitutes the control mechanism which, due to the fact that it is not under the load transmitted by the gearing device proper, may be of relatively small construction having only the limited strength necessary to transmit the controlling forces. The controlling mechanism is very sensitive and requires very little power, and therefore the parts of the control mechanism may be very light and inexpensive. The control mechanism illustrated in Figure 1 will now be described.

Mounted on the drive shaft 10 there is provided a gear 35 which may be connected in any suitable manner, to a shaft 36. Gears 35 and 37 are selected to give the desired gear ratio. In the present illustration, this driving connection is accomplished by means of a spur gear 37, which meshes with the spur gear 35 keyed to shaft 36. Shaft 36 is adapted to drive a friction wheel 38 which is splined to the shaft so as to be rotated thereby and yet be free to slide axially therealong. Any suitable means may be provided for causing the friction wheel 38 to move axially on the shaft 36 but as here illustrated, there may be provided a hub 39 and a grooved collar 40 attached to the friction wheel 38. The grooved collar 40 may then cooperate with a control yoke 41 constructed as a part of an operating lever 42 which may be pivoted as at 43 so that oscillations of the lever will cause the grooved collar, hub, and friction wheel to move axially along the shaft 36 while at all times maintaining a driving connection between the shaft and the friction wheel. The friction wheel may be disposed in driving engagement with a frictionally driven disk 45 carried by a shaft 46 on which the control worm 16 is also mounted.

The shaft 36 is preferably disposed with respect to the shaft 46 so that the friction wheel 38 is movable for engagement with the friction disk 45 on a radial line whereby in its maximum position to the right the friction wheel 38 will contact the friction disk 40 at its center or axis of rotation and in its position to the left of the center it will engage successively, portions of the disk lying on its radius.

It is thus apparent that the control lever 42 may be adjusted to establish any desired gear ratio between the friction wheel 38 and the friction disk 45 so that for any adjusted position the rotation of the power shaft 10 will impart a rotation to the control worm 16 at a determined and constant ratio. If the speed of the power shaft 10 varies then the speed of the control worm 16 will vary correspondingly and the ratio will be maintained the same. The ratio however, can be changed when and only if the control lever 42 is readjusted to bring the friction wheel 38 to a new position on the friction disk 45.

In the form of the invention illustrated, the ratio between the ring gear 17 and the ring gear 29 through the instrumentality of the beveled gear 20, shafts 21 and 22 and spur gears 23 and 24 is such as to provide a 1-1 ratio so that these two ring gears always rotate in the same direction at the same number of revolutions per minute.

With the gearing thus adjusted it will be apparent that the above described gearing assembly will permit the driven gear 32 and shaft 34 to remain stationary even when the power shaft 10 is rotating at any speed whatsoever provided that the ring gear 13 is likewise stationary. Thus by placing control lever 42 in such position that the friction gear 38 lies on the center or axis of the friction disk 45, the control worm 16 will be caused to remain stationary and will thus hold the ring gear 13 against rotation through the meshing of the worm 16 with the teeth of the worm gear 15. With the parts so adjusted the power shaft with the beveled planetary gears 12—12, and 28—28 and the inner ring gears 17 and 29, respectively, may rotate at any desired speed according to the speed of the power shaft without however, imparting any motion to the driven gear 32 or driven shaft 34. Accordingly, through the adjustment of the control lever 42, the driven shaft may be brought to rest without in any way altering or influencing the rotation of the driving shaft 10 or the prime mover or other source of power.

If it is now desired to connect the driven mechanism for rotation by the prime mover this may be done by moving the position of the control lever 42 so as to bring the friction wheel 38 in engagement with the friction disk 45 at such location as to impart rotation to the disk 45, shaft 46 and control worm 16. As the friction wheel 38 moves outwardly from the center of the disk 45, the rotation of the worm 16 commences slowly and gradually increases to a point where the drive is relatively rapid at the time the friction wheel 38 reaches a portion adjacent the perimeter of the friction disk 45. As the control worm 16 commences to rotate under the influence of the friction drive, the ring gear 13 will likewise rotate and at a definite ratio with respect to the rotation of the power shaft 10 and as the gear 13 rotates so will the driven gear 32 rotate in the same direction and at the same speed. Thus by shifting the lever 42 to gradually increase the speed of the worm and decrease the gear ratio between the worm and drive shaft, a similar change results in the operation of the gearing mechanism to impart the driving power of the drive shaft 10 to the driven shaft 34.

Particular attention is called to an important function of the worm 25 and the control worm 16, which in addition to serving as ordinary gearing elements for imparting rotary motion to the ring gears 29 and 13 respectively, serve as holding devices to prevent the ring gears referred to from rotating under the influence of the planetary beveled gears 12—12 and 28—28 except to the extent that they are permitted to rotate through the controlled rotation of the worms themselves. In other words, these worms serve as controlling devices requiring under ordinary operating conditions, relatively little power, which serve primarily to hold back the ring gears but permitting the ring gears to rotate in the direction in which they normally have a tendency to rotate. It will thus be apparent that the worms do not require much power because their function is that of holding devices rather than driving devices. In practice, when drive shaft 10 is rotating and the control worm 16 is likewise rotating at the desired speed, all of the power of the prime mover in rotating the shaft 10 is imparted to the driven shaft 34 under the conditions of the particular gear ratio established at the moment. Although the driving of the driven shaft 34 through the mechanism depends upon a continued rotation of the control worm 16, no substantial power need be applied to the worm 16 to drive the ring gear 13, because the ring gear 13 has a normal tendency to rotate in the direction of the power shaft 10 on its own account and thus the control worm 16 only releases the ring gear 13 or in other words, permits it to rotate at a rate controlled by the speed of the worm itself. From an inspection of Figure 1, it will be apparent that the action of the planetary bevels 12—12 in between the two ring gears 13, and 17, respectively, will act to impart a tendency to rotate upon the ring gear 13, in the direction of the drive shaft 10, so long as the worm 25 is engaged as shown, with the worm gear 29. Although worm 25 can drive the worm gear 29, these gears are so constructed that the reverse driving relationship cannot take place and consequently no substantial back driving tendency is permitted through the system to interfere with the normal tendency of the ring gear 13 to rotate in the same direction as the power shaft 10. By virtue of this construction it has been found that any amount of power applied to the power shaft 10 can be controlled by application of an almost negligible amount of power applied to the control worm 16. For this reason any simple control drive mechanism such as the friction wheel 38 and cooperating disk 45 may be employed and has been found to serve well as a control driving means for the worm 16. It is to be understood however, that other forms of control mechanism may be employed provided only that they maintain the selected ratio between the rotation of the power shaft and the rotation of the control worm 16 for all speeds of the power shaft.

As above pointed out, the construction illustrated in Figure 1 employs a 1–1 gearing ratio between the ring gear 17 and the ring gear 29, and under such circumstances when the ring gear 13 is stationary the driven gear 32 and shaft 34 are likewise stationary. However, any gear ratio between the two inner ring gears may be provided and when, for instance, the ratio is two to three, between the ring gear 17 and ring gear 29, a slightly modified action results which provides for reversing the direction of rotation of the driven shaft without reversing the direction of rotation of the power shaft 10.

With the gear ratio of two to three, as suggested, if the control worm 16, is stationary, then the ring gear 29 will be making three rotations for each rotation of the drive shaft 10 and in the same direction. This will result in a rotation of the driven gear 32 and shaft 34 at the same speed as that of the power shaft 10 but in the opposite direction. This produces a reverse drive up to a one to one ratio. Now if the control worm 16 is gradually rotated in the same direction as the rotation of the power shaft 10, this change results in a slowing down of the driven gear 32 and shaft 34 until the control worm 16 has increased its ratio of speed to a certain point whereupon the driven gear and shaft come to rest. From this point on, a continued increase in the ratio of rotation of the control worm 16 relative to the rotation of the driven shaft 10 will result in the rotation of the driven gear 32 and shaft 34 in the same direction as that of the power shaft 10 and at a constantly increasing speed for a given speed of the drive shaft.

It will thus be apparent that by selecting various gear ratios between the ring gear 17 and the ring gear 29 that various driving relationships may be established in accordance with the needs of the particular installation.

It is further contemplated that the worm 25 may be placed elsewhere in the gearing system between the ring gear 29 and the ring gear 17 provided only that it is so connected that the ring gear 29 cannot drive the ring gear 27 through the gear train referred to. It is also contemplated that any other device which will drive only one way may be utilized in place of the worm.

A modified gearing connection is illustrated in Figure 3 where the worm is placed in such a manner that the maximum R. P. M. required for it is materially reduced. In practice, it has been found desirable to provide an installation in which the worm 25 is required to rotate only at the lowest possible maximum speed.

Referring now to Figure 2, the applicant has provided a modified control mechanism which permits the driven shaft to be released, in effect, from the immediate control of the gearing system so that, for instance, if this device is applied to an automobile, the wheels will be free for coasting or free wheeling forward and backward without adversely influencing the gearing system or imparting unwanted loads thereto or to the prime mover. This may be accomplished by a modified control mechanism of the type illustrated in Figures 2 and 3.

In Figure 2, the parts corresponding to the parts of Figure 1 are identified by the same reference numerals applied to those parts in Figure 1. In this form of the invention the power shaft 10 is connected by beveled gears 50 and 51, and shaft 52 to a friction disk 53. This friction disk is adapted for frictional driving engagement with a friction wheel 54 which is slidably mounted on a shaft 55 by means of a control collar 56, operating lever 57 and a control yoke 58. The collar and friction wheel are splined to the shaft 55 in much the same manner previously described in connection with the mechanism in Figure 1. At the end of the shaft 55, however, there is a suitable clutch element 59 adapted to be selectively engaged with and disengaged from a cooperating clutch part 60. The function of this clutch is to selectively connect the shaft 55 with a shaft 61 as shown in Figure 2. Shaft 61 is provided with a beveled gear 62 which meshes with a second beveled gear 63 for driving the shaft 46 which is keyed to the control worm 16. This control worm is in mesh with a worm gear 15 in exactly the same manner previously described in connection with Figure 1.

The two sets of differential gear trains here illustrated in Figure 2 will not be described again because they are in all essentials, the same as those previously described in connection with Figure 1. It will be noted however, that the beveled gear 17 is connected to the beveled gear 29 through the instrumentality of beveled gear 20, shaft 21, worm 25 and worm gear 65, which is directly connected to the ring gear 29 through shaft 66, gears 67 and 68.

By this arrangement the worm 25 is so disposed as to avoid the necessity for very high speeds of rotation. Shaft 61 is also provided with a clutch element 70 which has a collar 71 and which is slidably keyed to the shaft 61. Opposed to the clutch element 70 is a cooperating clutch part 72, which is fixed to the shaft 73. The opposite end of the shaft 73 is connected by beveled gears 74 and 75 and shaft 76 and beveled gears 77 and 78 to the driven shaft 34.

The clutch elements 60 and 70 are preferably connected to operate together by suitable clutch actuating mechanism such as represented by levers 80 and 81, pivoted respectively at 82 and 83 and which have outer ends connected by a pivoted bar 84. Connected at some point in the length of the bar 84 is an operating lever 85 pivoted at 86 and having a handle 87 whereby oscillation of the operating lever will cause simultaneous movement of the clutch elements 60 and 70. These clutch elements are so adjusted that when one of them is connected, the other is disconnected with the result that shaft 61 is selectively connected to either shaft 55 or shaft 73.

The function of this construction is that of effectively freeing the driven shaft from the direct control of the gearing system and from the main power shaft when such operation is desirable. For instance, when the operating lever 85 is moved to connect clutch elements 70 and 72 (at a time when the driven shaft 34 is stationary), then the controlling worm 16 becomes directly connected with the driven shaft 34 through the connecting gearing and clutch with the result that the ring gear 13 is caused to rotate in exactly the proper manner to permit the driven gear 32 to rotate free of the power shaft 10.

With the parts so connected, as for instance, with the gearing applied to an automobile, the driven shaft will be freed from its effective connection with the power shaft and the automobile will be free to coast forward or backward or be pushed or otherwise handled as desired without in any way interfering with the main gear train or the power shaft irrespective of whether the power shaft is rotating or stationary and irrespective of its speed of rotation.

On the other hand, when it is desired to clutch or connect the driven shaft to the main power shaft it is only necessary to throw the lever 85 so as to engage the clutch parts 59 and 60 and disconnect the clutch parts 70 and 72. This renders ineffective, the rotation of the shaft 73 from the driven shaft 34 and once more establishes a variable driving connection between the power shaft 10 and the control worm 16. With the parts so adjusted, the arrangement of the mechanism illustrated in Figure 2 is substantially identical with that illustrated in Figure 1.

In Figure 3 there is illustrated a further modified form of control mechanism which serves to disconnect in effect, the driven shaft from the power shaft in the same manner as that of the mechanism illustrated in Figure 2. This mechanism is particularly useful in cases where the intermediate gearing for connecting the ring gear, 17 and 29 provides a gearing ratio other than 1 to 1 ratio. For instance, in the illustration given above with respect to Figure 1 wherein the connecting gearing between ring gears 17 and 29 provided a two to three ratio whereby a reversed rotation of the driven shaft is possible, the construction shown in Figure 2 would not serve to release the driven shaft when the driven shaft is stationary. This is because with a two to three ratio in the intermediate gears, the control worm 16 must have an initial rotation with the power shaft 10 when the driven gear 32 and drive shaft 34 are stationary. Thus it would not be possible to disconnect the clutch member 59 and 60 illustrated in Figure 2, under these circumstances. Accordingly, for this type of operation, the shaft 55 is connected to gear 62 not through a clutch but through a differential gear unit of any suitable type but preferably of the type illustrated in Figure 3. This consists of a gear 180, in engagement with planetary gears 181—181 carried on axles 182—182 fixed to rotate with shaft 55. In engagement with the beveled planetary gears 181—181 is a gear 183 which is fixed to the shaft 184. Shaft 184 has splined thereto a clutch element 185 having a brake disk 186 and a control ring 187. The clutch brake disk and control ring are adapted to rotate with the shaft and to slide axially therealong. An operating lever 188 pivoted at 189 and having a handle 90 will serve to actuate the clutch and brake elements. The disk brake 186 is adapted to engage stationary parts 91 for effectively holding shaft 184 against rotation when the lever 180 moves the clutch element to the left as illustrated in Figure 3.

Clutch element 185 is adapted for cooperative engagement with a second clutch element 92 which is fixed to the shaft 73 which is in turn connected to the driven shaft 34. This part of the mechanism is exactly the same as that previously described in connection with the construction illustrated in Figure 2.

This construction enables the release of the driven shaft in the same manner previously described and at the same time permits the control worm 16 to remain in driving connection with the power shaft 10. However, with the control worm 16 connected to the power shaft 10, the resulting motion imparted to the gear 13 is modified through the differential gearing 180, 181 and 183, in exactly the manner and to exactly the extent necessary to compensate for and permit the free movement of the driven shaft 34. Thus if the device illustrated in Figure 3 applied to an automobile in which the ratio of the connecting gears 17 and 29 is such as to provide a two to three ratio or other ratio permitting a reverse rotation of the driven shaft, then, by connecting the clutch 185 and 92, the driven shaft shaft may be released to permit the automobile to coast or free wheel forwardly or backwardly or to be pushed or otherwise handled without interfering with the power shaft 10, irrespective of whether the power shaft is rotating or stationary and irrespective of its speed.

From the above description of the preferred embodiment of this invention it will be apparent that this gearing mechanism provides a very useful, variable drive which may be applied to various types of installations, particularly to so-called heavy duty installations where relatively great torque is transmitted. In installations of this type, frequently the torque or load transmitted is so great that it is impossible under the required operating conditions, to employ clutches with any degree of satisfaction.

The gearing of this invention will be particularly useful in installations of this kind because no clutch is required as a part of the gear mechanism proper, but as illustrated if at all, only in connection with the control mechanism. In other words, the gearing of this invention may serve as a permanent gearing connection between a prime mover and a driven shaft with the result that while maintaining at all times, the direct gearing connection of the gear mechanism proper, the driven shaft through the control mechanism may be driven with the maximum power of the prime mover at any selected gear ratio and also may be brought to rest, caused to reverse, or in effect become released therefrom. The driven shaft may be brought to rest or in effect released from the driving shaft irrespective of the continued speed of rotation of the driven shaft.

It will be further noted that through the worms or their equivalent, the mechanism may be controlled with an almost negligible amount of power whereby the tremendous forces transmitted to the gearing may be effectively controlled with a simple, inexpensive motor or through the instrumentality of friction gearing or other equivalent means.

I claim:

1. A gearing mechanism of the character described comprising a driving shaft, a driven shaft, and a pair of differential gearing units both connected through their planetary gears to said driving shaft, the second of said gearing units being connected to said driven shaft and gearing means connecting said first and second gearing units including a worm permitting said first gearing unit to drive said second gearing unit but preventing said second gearing unit from driving said first gearing unit.

2. A gearing mechanism of the character described comprising a driving shaft, a driven shaft, and a pair of differential gearing units both connected through their planetary gears to said driving shaft, the second of said gearing units being connected to said driven shaft and gearing means connecting said first and second gearing units including a worm permitting said first gearing unit to drive said second gearing unit but preventing said second gearing unit from driving said first gearing unit, and means for controlling said first gearing unit comprising a worm and means for driving said worm at a R. P. M. which is predetermined and has a selected ratio with respect to the R. P. M. of said drive shaft.

3. A gearing device of the character described comprising a driving shaft and a driven shaft, a control device and a differential gearing unit having its planetary gears connected to said driving shaft and one of its other gears connected to said driven shaft, a second differential gear unit having its planetary gears connected to said driving shaft and having one of its other gears connected to said control device, and means connecting the other two gears of said differential gear units constructed so that the gear of said controlled differential gear unit may drive the gear of the differential gear unit connected to said driven shaft but so that the reverse drive is prevented.

4. A gearing device of the character described comprising a driving shaft and a driven shaft, a control device and a differential gearing unit having its planetary gears connected to said driving shaft and one of its other gears connected to said driven shaft, a second differential gear unit having its planetary gears connected to said driving shaft and having one of its other gears connected to said control device, and gearing connecting the other two gears of said differential gear units comprising a worm which permits the controlled gear unit to drive the gear unit connected to the driven shaft but prevents the reverse drive.

5. A gearing device of the character described comprising a driving shaft, a driven shaft and first and second differential gearing units each having three interconnected gearing elements, one of the gearing elements of each of said differential gearing units being connected to said driving shaft, another of said gearing elements of the second of said differential gearing units being connected to said driven shaft, other of the gearing elements of said differential gearing units being connected to each other and the third gearing element of said first differential gearing unit being connected to a control device, the connection between said differential gearing units being such as to permit transmission of driving forces from the first to the second of said differential gearing units while preventing transmission of driving forces in the opposite direction, and means for driving said control device in predetermined ratio from said driving shaft, and other means for driving said control device from said driven shaft and means for selectively connecting one or the other of said last named means to said control device.

6. A gearing device of the character described comprising a driving shaft, a driven shaft and first and second differential gearing units, said first and second differential gearing units each having one of its gearing elements connected to said driving shaft, the second differential gearing unit having another of its gearing elements connected to said driven shaft, the first differential gearing unit having another of its gearing elements connected to a control device and means connecting the third gearing elements of said two differential gearing devices to each other so that driving forces may be transmitted from said first differential unit to said second differential unit, but the transmission of driving forces in the reverse direction is prevented, means for driving said control device from said driving shaft and means for driving said control device from said driven shaft, and means for selectively connecting one or the other of said two last named driving means whereby said control device may be selectively driven either by said driving or by said driven shafts.

7. A gearing device of the character described comprising a driving shaft, a driven shaft and first and second differential gearing units, said first and second differential gearing units each having one of its gearing elements connected to said driving shaft, the second differential gearing unit having another of its gearing elements connected to said driven shaft, the first differential gearing unit having another of its gearing elements connected to a control device and means connecting the third gearing elements of said two differential gearing devices to each other so that driving forces may be transmitted from said first differential unit to said second differential unit, but the transmission of driving forces in the reverse direction is prevented, and means for driving said control device from said driving shaft including means for varying the ratio therebetween, means for driving said control device from said driven shaft, and means for selectively connecting one or the other of said two last named driving means whereby said control device may be selectively connected to either said driving shaft or to said driven shaft.

8. A gearing device of the character described comprising a driving shaft, a driven shaft and first and second differential gearing units, said first and second differential gearing units each having one of its gearing elements connected to said driving shaft, the second differential gearing unit having another of its gearing elements connected to said driven shaft, the first differential gearing unit having another of its gearing elements connected to a control device and means connecting the third gearing elements of said two differential gearing devices to each other so that driving forces may be transmitted from said first differential unit to said second differential unit, but the transmission of driving forces in the reverse direction is prevented, and means for driving said control device from said driving shaft including means for varying the ratio therebetween, means for driving said control device from said driven shaft, and means for selectively connecting one or the other of said two last named driving means whereby said control device may be selectively connected to either said driving shaft or to said driven shaft, and a third differential gearing unit having two of its gearing elements connected to said driving and driven shafts respectively, and its third gearing element connected to drive said control means.

9. A gearing device of the character described comprising a driving shaft, a driven shaft and first and second differential gearing units, said first and second differential gearing units each having one of its gearing elements connected to said driving shaft, the second differential gearing unit having another of its gearing elements connected to said driven shaft, the first differential gearing unit having another of its gearing elements connected to a control device and means connecting the third gearing elements of said two differential gearing devices to each other so that driving forces may be transmitted from said first differential unit to said second differential unit, but the transmission of driving forces in the reverse direction is prevented, and means for driving said control device from said driving shaft including means for varying the ratio therebetween, means for driving said control device from said driven shaft, and means for selectively connecting one or the other of said two last named driving means whereby said control device may be selectively connected to either said driving shaft or to said driven shaft, and a third differential gearing unit having two of its gearing elements connected to said driving and driven shafts respectively, and its third gearing element connected to drive said control means, and means for disconnecting said last named differential unit from said driven shaft and for holding stationary, the disconnected gearing element of said differential unit.

ROBERT P. POWERS.

CERTIFICATE OF CORRECTION.

Patent No. 2,229,338. January 21, 1941.

ROBERT P. POWERS.

It is hereby certified that error appears in the printed specification of the above numbered patent requiring correction as follows: Page 4, second column, line 35, after "clutch" insert --element--; line 36, strike out the word "shaft"; line 71, for "driven" read --driving--; line 75, for the word "to" read --by--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.